(12) United States Patent
Gribble et al.

(10) Patent No.: US 8,505,210 B2
(45) Date of Patent: Aug. 13, 2013

(54) ABSOLUTE ENCODER SETUP INDICATION

(75) Inventors: Andrew Paul Gribble, Bristol (GB); Iain Robert Gordon-Ingram, Wiltshire (GB)

(73) Assignee: Renishaw PLC, Wotton-Under-Edge (GB)

( * ) Notice: Subject to any disclaimer, the term of this patent is extended or adjusted under 35 U.S.C. 154(b) by 317 days.

(21) Appl. No.: 13/120,349

(22) PCT Filed: Oct. 27, 2009

(86) PCT No.: PCT/GB2009/002558
§ 371 (c)(1), (2), (4) Date: Mar. 22, 2011

(87) PCT Pub. No.: WO2010/049682
PCT Pub. Date: May 6, 2010

(65) Prior Publication Data
US 2011/0173832 A1   Jul. 21, 2011

(30) Foreign Application Priority Data
Oct. 28, 2008 (GB) .................... 0819767.5

(51) Int. Cl.
*G01D 5/347* (2006.01)

(52) U.S. Cl.
USPC .............................. 33/701; 33/706

(58) Field of Classification Search
USPC ................... 33/1 PT, 706, 707, 708, 701
See application file for complete search history.

(56) References Cited

U.S. PATENT DOCUMENTS

| | | | |
|---|---|---|---|
| 5,128,609 A | 7/1992 | Howley | |
| 5,241,173 A | 8/1993 | Howley et al. | |
| 5,260,769 A | 11/1993 | Ieki et al. | |
| 5,440,501 A * | 8/1995 | Shimomura et al. | 33/706 |
| 5,883,298 A | 3/1999 | Holzapfel et al. | |
| 5,973,620 A | 10/1999 | Holzapfel et al. | |
| 6,976,317 B2 * | 12/2005 | Rodi | 33/706 |
| 6,996,494 B2 | 2/2006 | Braasch et al. | |
| 7,089,678 B2 * | 8/2006 | Novak et al. | 33/706 |
| 7,116,252 B2 | 10/2006 | Teraguchi | |
| 7,408,654 B1 * | 8/2008 | Hardin et al. | 33/707 |

(Continued)

FOREIGN PATENT DOCUMENTS

| | | |
|---|---|---|
| DE | 93 21 274 U1 | 1/1997 |
| EP | 0 503 716 A1 | 9/1992 |

(Continued)

OTHER PUBLICATIONS

LIKA User Manual SMA1, pp. 1-12.

(Continued)

*Primary Examiner* — G. Bradley Bennett
(74) *Attorney, Agent, or Firm* — Oliff & Berridge, PLC

(57) ABSTRACT

This invention relates to a method of operating an absolute encoder apparatus comprising a scale having features defining absolute position information in at least one measuring dimension, and a readhead configured to read the features. The method comprises: obtaining at least one representation of at least some of the features defining absolute position information; analyzing the at least one representation to determine at least one parameter indicative of the quality of the representation; and providing an output indicative of the relative setup of the scale and readhead based at least in part on the at least one parameter.

25 Claims, 3 Drawing Sheets

(56) References Cited

U.S. PATENT DOCUMENTS

| | | | |
|---|---|---|---|
| 7,825,368 B2* | 11/2010 | Kusano | 33/1 PT |
| 2003/0016369 A1 | 1/2003 | Benner et al. | |
| 2007/0256313 A1* | 11/2007 | McAdam | 33/706 |

FOREIGN PATENT DOCUMENTS

| | | |
|---|---|---|
| EP | 0 514 081 A1 | 11/1992 |
| EP | 1 099 936 A1 | 5/2001 |
| EP | 1 562 025 A2 | 8/2005 |
| EP | 1 635 073 A2 | 3/2006 |
| EP | 1 970 672 A2 | 9/2008 |
| GB | 2 335 987 A | 10/1999 |
| JP | 8-043147 A | 2/1996 |
| JP | 8-178693 A | 7/1996 |
| JP | A-2007-127530 | 5/2007 |
| WO | WO 02/31444 | 4/2002 |
| WO | WO 02/084223 A1 | 10/2002 |
| WO | WO 03/034000 | 4/2003 |
| WO | WO 2005/124283 | 12/2005 |
| WO | WO 2007/057645 | 5/2007 |
| WO | WO 2007/083118 A1 | 7/2007 |

OTHER PUBLICATIONS

Heidenhain, "Preliminary Product Information", LIC 4000 Series, Exposed Absolute Linear Encoders, Apr. 2009.
LIC 4000—Serial Interface Data Sheet. Apr. 12, 2008.
Chinese Office Action issued in Chinese Patent Application No. 200980143126.1 dated Jan. 18, 2013 (w/translation).
British Search Report in British Application No. GB 0819767.5; dated Jan. 21, 2009.
International Search Report in International Application No. PCT/GB2009/002558; dated Apr. 22, 2010.
Written Opinion of the International Searching Authority in International Application No. PCT/GB2009/002558; dated Apr. 22, 2010.

* cited by examiner

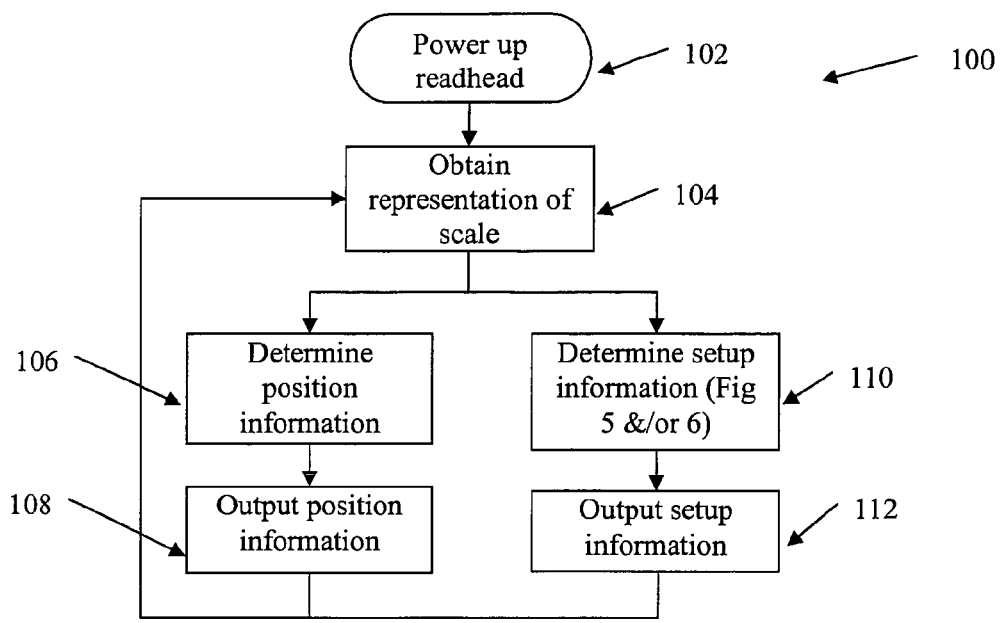
Figure 4
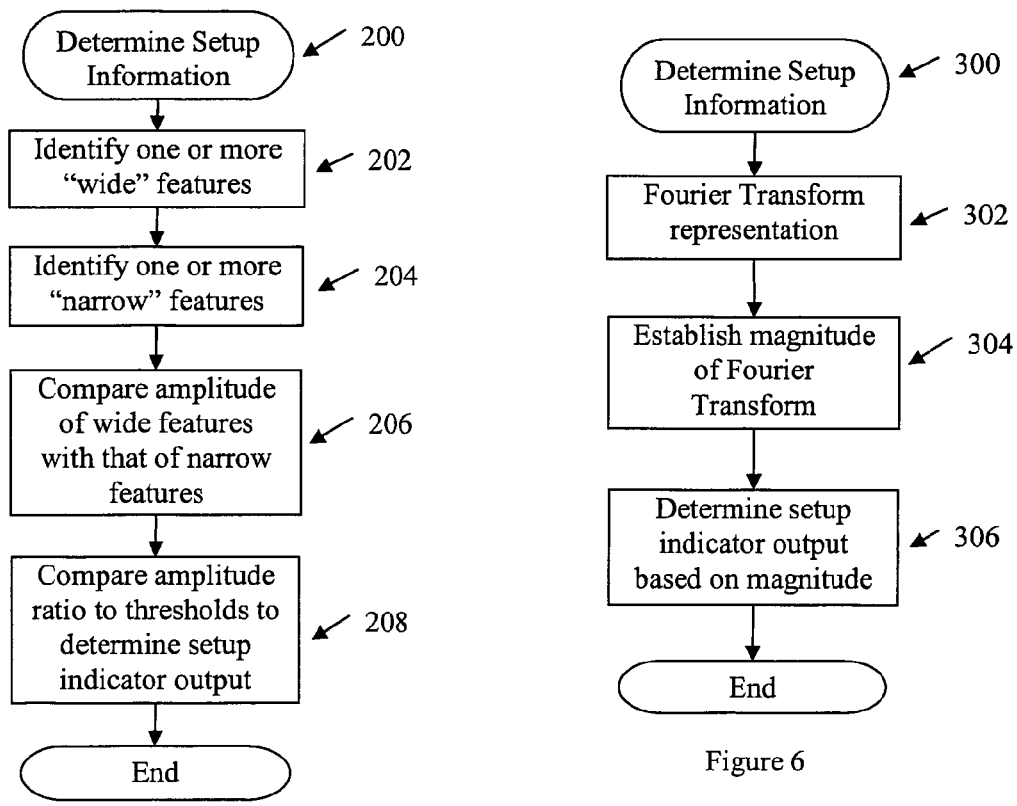
Figure 5
Figure 6

ABSOLUTE ENCODER SETUP INDICATION

This invention relates to absolute position encoders and in particular to a method and apparatus for determining the setup of an absolute position encoder.

Absolute position encoders which enable the absolute position of a readhead relative to a scale to be determined are known. Such encoders typically comprise a scale having at least one track with unique position data formed continuously along the measuring dimension of the scale. The data can be in the form of, for instance, a pseudorandom bit sequence or discrete codewords. By reading this data the readhead can determine the relative absolute position of it and the scale. Absolute encoders can provide position information in one dimension, for example as described in the International Patent Application PCT/GB2002/001629 published under WO2002/084223 and European Patent no. 0503716, or in two dimensions, for instance as described in European Patent no. 1099936.

The proper functioning of absolute encoders can depend on the proper set up of the readhead and scale. This can include the relative arrangement of the readhead and scale in degrees of freedom other than in the measuring dimension. For instance, the ability of the readhead to properly read the scale can depend on the readhead and scale being relatively setup at the appropriate rideheight, and/or properly aligned such that the readhead is not yawed, pitched or rolled relative to the scale. It can also depend on other factors independent of the relative arrangement of the scale and readhead. For instance, the ability of the readhead to properly read the scale can depend on the cleanliness of the scale.

The present invention provides an absolute position encoder which provides an output indicative of the readhead and scale set up based on an analysis of a representation of the absolute scale features.

According to a first aspect of the invention there is provided a method of operating an absolute encoder apparatus, the encoder apparatus comprising a scale having features defining absolute position information in at least one measuring dimension, and a readhead configured to read the features, the method comprising: obtaining at least one representation of at least some of the features defining absolute position information; analysing the at least one representation to determine at least one parameter indicative of the quality of the representation; and providing an output indicative of the relative setup of the scale and readhead based at least in part on the at least one parameter.

Determining the quality of the representation has been found to provide a consistently reliable way of checking whether the readhead and scale are properly set up, including checking whether the readhead and scale are properly arranged relative to each other, and also for checking the state of the scale. This can be important in order to ensure that the readhead can obtain accurate and/or reliable position information. Accordingly, the parameter indicative of the quality of the representation can provide a measure of the suitability of the representation to provide position information, and in particular reliable and/or accurate position information.

The output can be used in many different ways to ensure the proper working of the encoder apparatus. For instance, and as described in more detail below, the output could be used to indicate to a user when the readhead and scale are properly set up thereby enabling the user to ensure that they are obtaining optimum performance from the encoder apparatus. If the output is indicative that sub-optimum performance is being achieved, a user could take corrective action. Optionally, the output could be received by, for example, a controller which may respond to the output (e.g. by stopping the machine on which the readhead is used).

Determining the at least one parameter can be based solely on the at least one representation of the features. Accordingly, this enables setup information regarding the relative arrangement of the readhead and scale to be determined from the at least one representation only. In particular, this enables setup information to be determined from features contained in a single track only. Accordingly, the method can be used with scales which comprise a single track only. As will be understood, if the scale is a one dimensional scale then the track can extend in one dimension only. If the scale is a two dimensional scale then the track can extend in two dimensions.

The encoder apparatus can be a magnetic or inductive encoder. The encoder apparatus can be a capacitive encoder. Optionally, the encoder apparatus is an optical encoder. In this case, the encoder apparatus could be a transmissive apparatus in which the readhead detects light transmitted through the scale. Optionally, the encoder apparatus could be a reflective apparatus in which the readhead detects light reflected off the scale. The readhead could comprise an optical source for illuminating the scale.

As will be understood, there are many suitable ways in which the features can be defined on a scale. For instance, features can be defined by markings having particular electromagnetic radiation (EMR) properties, for example particular optical properties, for instance by the particular optical transmissivity or reflectivity of parts of the scale. Accordingly, the scale could be an optical scale. A feature could, for example, be defined by parts of the scale having a minimum reflectivity or transmissivity value. Optionally, a feature could for example be defined by parts of the scale having a maximum reflectivity or transmissivity value. In the case of a magnetic encoder, features can be defined by markings having particular magnetic properties or for instance by the presence or absence of ferromagnetic material. In the case of capacitive scale features can be defined by markings having particular capacitive properties.

The features can take the form of lines, dots or other configurations which can be read by a readhead. Preferred configurations for one-dimensional scales can comprise lines extending across the entire width of a track in a dimension perpendicular to the measuring dimension. Absolute position information can be encoded in the features by the selective configuration of the features in the track. For example, the size and/or spacing of a series of features could be selected to encode data in the track.

Sensors suitable for use with the invention include charge-coupled devices (CCDs), Complimentary Metal Oxide Semiconductor (CMOS) sensors, photodiode arrays, hall sensor arrays, magneto-resistive sensor arrays, and arrays of capacitive sensors. A sensor arrangement suitable for use in the readhead to obtain the representation could comprise an array of discrete sensor elements. For example, the sensor could comprise a one dimensional linear array of discrete sensor elements. For instance, in the case of the scale being optical scale, the sensor could be a one dimensional CMOS sensor. The array of discrete sensor elements could be arranged such that the array extends parallel to the measuring dimension of the scale. This arrangement is particularly useful when the features comprise lines extending perpendicular to the measuring dimension of the scale.

Analysing the representation to determine a parameter indicative of the quality of the representation can comprise assessing the representation with regard to predetermined criterion. Suitable criterion can comprise the orientation of at least some of features in the at least one representation, the quality of at least some of the features in the representation, the distortion of the representation, and/or the magnification of the representation.

Accordingly, analysing the at least one representation can comprise analysing the orientation of features in the at least one representation. This can be useful for determining the relative yaw of the readhead and scale (i.e. relative rotation about an axis extending perpendicular to the scale). The orientation of the features in the at least one representation could be determined when using a sensor array which extends in two dimensions, such as a two dimensional CCD or two dimensional CMOS sensor.

Furthermore, analysing the at least one representation can comprise analysing the quality of at least some of the features in the representation. This can comprise analysing how well at least some of the features are reproduced in the representation. This can comprise analysing the strength of at least some of the features contained in the at least one representation. The property used to measure the strength of the features depends on the type of scale used (in particular the way in which the features are defined on the scale) and the method used to detect the features. For instance, the strength could comprise the size of the features. For example, this could be their size in the measuring dimension. Optionally, the strength comprises the amplitude of at least some of the features in the at least one representation. Optionally, the strength can comprise the sharpness of the edges of features.

Other properties of the representation could be used to determine the parameter indicative of the quality of the representation. For example, absolute encoder scales often include redundancy in the absolute position data in order that the readhead can perform error checking and/or error correction on the representation. In this case, determining the at least one parameter can comprise determining the error rate of the representation. This can comprise determining the number of bits which have to be corrected.

Furthermore, analysing the at least one representation can comprise comparing properties of the features in the representation (e.g. their amplitude, sharpness and/or magnification) across the representation. For example, this can comprise determining if the amplitude, of at least one feature at one end of the representation is greater than that at least one feature at the opposite end of the representation. If so, then this can be an indication that the readhead and scale are tilted (e.g. pitched) relative to each other.

The output can at least partly be based on the determination of whether the quality of at least a part of the representation meets a threshold quality. The threshold quality could be set to be greater than the quality of representation required in order to extract reliable position information from the representation. This can help to ensure that corrective action can be taken before the readhead fails (e.g. provides an incorrect position reading or fails to provide a position reading). The output can be indicative of the level of the quality of the representation. Accordingly, this can help to provide a measure of the extent by which readhead and scale are not properly set up and the likelihood that a readhead failure will occur. For example, the output can at least partly be based on the determination of the extent by which the quality of the representation meets a minimum threshold quality. The output could be used to indicate how the quality of the representation could be improved. Accordingly, the output could convey information on how the quality of the representation is sub-optimal.

The track can comprise a first type of feature and at least a second type of feature. How well the first type of feature is reproduced in the representation can be more sensitive to the setup of the readhead and scale than that of the second type of feature. In this case, analysing the at least one representation can comprise analysing at least one of the first type features.

The first and second types of features on the track could be distinguished by their relative sizes. For instance, the features of the first type can be features that are smaller in dimension than those features of the second type. Accordingly, analysing the at least one representation can comprise analysing at least one of the smaller features of the track. In particular, the features of the first type can be features that are smaller in the measuring dimension than those of the second type.

As will be understood, the features of the first type do not necessarily have to be identical in all or any respect. For instance, they could have different shapes and/or sizes. A feature could be identified as being of the first type if its size in the at least one measuring dimension is less than a threshold size. The features of the second type also do not necessarily have to be identical in all or any respect. A feature could be identified as being of the second type if its size in the at least one measuring dimension is greater than a threshold size.

Analysing the at least one representation can comprise comparing the features of the first type as reproduced in the representation to the features of the second type as reproduced in the representation. In particular, this can comprise comparing the strength of features of the first type in the representation to the strength of features of the second type in the representation. Optionally, this can comprise comparing the amplitude of features of the first type in the representation to the amplitude of features of the second type in the representation.

Analysing the at least one representation can comprise Fourier Transforming at least a part of the representation of at least some of the features. In particular, analysing can comprise Fourier Transforming at least a part of the representation of the features substantially at the spatial frequency of the features. Optionally, analysing can comprise Fourier Transforming at least a part of the representation of the features substantially at a harmonic of the spatial frequency of the features. The parameter indicative of the quality of the representation could be based on the magnitude of the Fourier Transform.

Optionally, analysing can comprise performing a Fast Fourier Transform (FFT) on at least a part of the representation of at least some of the features. The parameter indicative of the quality could be based on the magnitude of the FFT at least one spatial frequency.

Features of the first type can be arranged substantially periodically in the track. In this case analysing the at least one representation can comprise Fourier Transforming at least a part of the representation of the features at the spatial frequency of the features of the first type. This can give a value indicative of the amplitude of the features of the first type in the at least one representation. Analysing can comprise performing one or more Fourier Transforms on at least a part of the representation of at least some of the features. Accordingly, these can be done at one or more different frequencies. At least some of the frequencies used could relate to the spatial frequencies of the features. In particular, at least some of the frequencies used could relate to the spatial frequencies of the features of the first type. Optionally, at least some of the frequencies do not relate to the spatial frequencies of the features. For example, if the spatial frequency of the features is not precisely known, then the method can comprise assessing a range of spatial frequencies. These could be a range of spatial frequencies that are estimated to be around the spatial frequency of the features. In these cases, the spatial frequency most closely corresponding to the spatial frequency of the features may have the largest Fourier Transform magnitude. The value of this largest magnitude may be indicative of the amplitude of features in the at least one representation. For instance, the value of this largest magnitude may be indicative of the amplitude of features of the first type in the at least one representation.

As will be understood, absolute data could be encoded in the track by the absence or presence of features of the first type (thereby forming the features of the second type). Accordingly, the number of features of the first type in the representation can vary depending on the relative position of the readhead and scale in the measuring dimension. This can in turn interfere with how well the value from the Fourier Transform reflects the quality of the features in the at least one representation. Accordingly, the method could comprise compensating the result of the Fourier Transform based on the number of features of the first type in the representation.

The output can be based on parameters other than just the at least one parameter indicative of the quality of at least a part of the representation. The output could be based on a combination of different factors. For instance, the output could be based also on readhead temperature (e.g. if the readhead comprises a temperature sensor), power status (e.g. battery status if the readhead comprises a battery), the relative velocity of the scale and readhead, and/or the relative acceleration of the scale and readhead. Accordingly, a single catch-all readhead setup output could be provided, which is based at least in part on the at least one parameter indicative of the quality of the representation. Optionally, the output can be based solely on the at least one parameter. Accordingly, the output can be based solely on the quality of the at least one representation.

The scale could comprise a plurality of tracks. For instance, in addition to a track containing features defining absolute position information, the scale could comprise a second track containing features defining incremental position information. Optionally, the scale comprises a single track only. This provides a particularly compact scale.

Obtaining the representation could comprise capturing a representation of at least some of the features. In particular, this could comprise obtaining a snapshot representation of at least some of the features.

The representation of at least some of the features can be an image of at least some of the features. Accordingly, the readhead could comprise at least one optical element for focussing EMR from the scale onto a sensor. Suitable optical elements include a lens, for example a cylindrical lens. Other suitable lenses include a diffractive lens, such as a Fresnel Zone Plate (FZP).

The method can further comprise analysing the at least one representation to determine the relative position of the readhead and scale in the at least one measuring dimension. Accordingly, the same representation could be used for both determining the setup output as well as determining positioning information. The position information could be determined before the setup information, vice versa, or they could be determined concurrently.

The analysis of the at least one representation could be performed by circuitry separate to the readhead. For instance, the at least one representation could be passed to circuitry external to the readhead for analysis. Preferably, the readhead comprises circuitry configured to analyse the at least one representation. The circuitry could be programmable or could be hardwired. Suitable circuitry could comprise a processor. As will be understood, processors include suitable devices for processing the representation and include analogue signal processors and/or digital processors. As will also be understood, the processor could comprise a single component or could comprise a plurality of distinct components which cooperate with each other.

The output could be a signal to circuitry. The circuitry could comprise a processor. The circuitry could be external to the readhead. In this case, the circuitry could be part of a controller. The controller could be configured to take action depending on the output. For example, the controller could be configured to stop the operation of a machine on which the encoder apparatus is used. Optionally, the output comprises a user detectable output. For instance, the output could comprise a visual indication to a user.

The readhead can comprise an output device, via which the user detectable output can be provided. For instance, the output device could comprise visual indication device. For example, the output device could comprise at least one light source. For instance, the output device could comprise at least one Light Emitting Diode (LED). As will be understood, other outputs may be used. For instance, an audible output could be used. Furthermore, more than one output could be provided. For instance, the method could comprise outputting a visual indication as well as an output to a processor, for example circuitry external to the readhead.

According to a second aspect of the invention there is provided an absolute encoder apparatus comprising a scale having features defining absolute position information in at least one measuring dimension, and a readhead configured to read the features, in which the apparatus is configured to: obtain, via the readhead, at least one representation of at least some of the features; analyse the at least one representation to determine at least one parameter indicative of the quality of the representation; and provide an output indicative of the relative setup of the scale and readhead based at least in part on the at least one parameter.

According to a third aspect of the invention there is provided a readhead for an absolute encoder apparatus, comprising: at least one sensor for obtaining at least one representation of at least some of the features; circuitry configured to analyse the at least one representation to determine at least one parameter indicative of the quality of the representation; and an output device for providing an output indicative of the relative setup of the scale and readhead based at least in part on the at least one parameter.

Embodiments of the invention will now be described with reference to the following drawings in which:

FIG. 4 is a flowchart illustrating the high-level operation of the readhead shown in FIG. 1;

FIG. 5 is a flowchart illustrating a first method for determining setup information;

FIG. 6 is a flowchart illustrating a second method for determining setup information;

Figure 1:
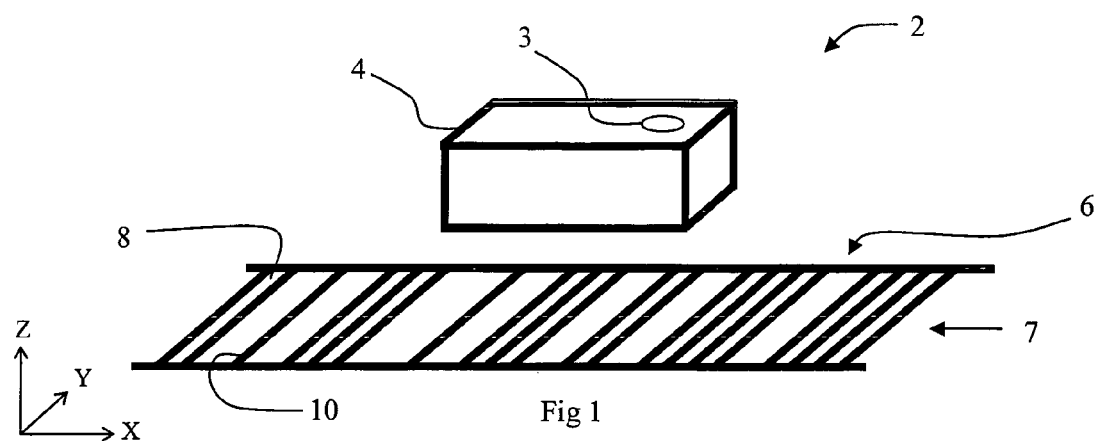
FIG. 1 shows a schematic isometric view of an absolute encoder according to the present invention.
Figure 2:
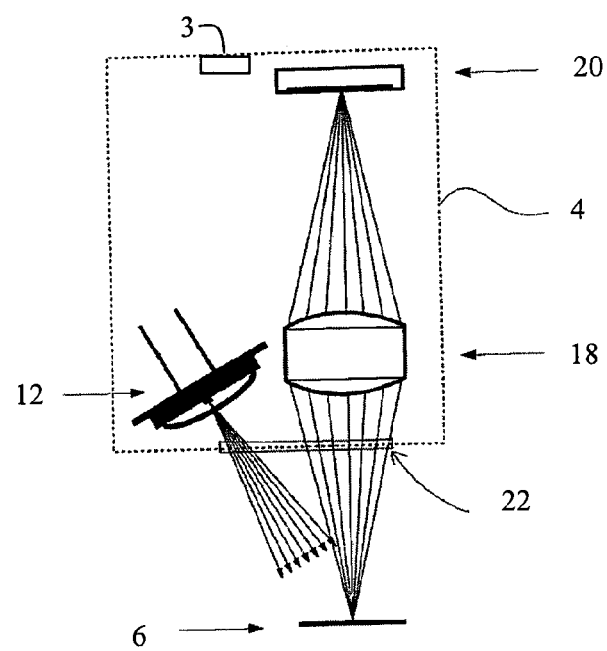
FIG. 2 is a schematic illustration of optical components of the absolute encoder shown in FIG. 1.

Referring to FIGS. 1 and 2, there is shown an absolute encoder 2 comprising a readhead 4 and a scale 6. The readhead 4 and scale 6 are provided on first and second objects respectively (not shown) which are moveable relative to each other along the X axis. In the embodiment described, the scale 6 is a linear scale. However, it will be understood that the scale 6 could be other types of scale, such as a rotary scale. Furthermore, the scale 6 provides measurement information in a single dimension only. However, it will be understood that this need not be the case, and for example the scale could provide measurement information in two dimensions. As shown, the readhead 4 comprises a first light source 3. In the embodiment described the first light source is mounted on the top face of the readhead 4 so that it can be easily seen by an operator when the encoder 2 is in use.

The scale 6 is an absolute scale and comprises a track 7 having a series of reflective 8 and non-reflective 10 lines which extend perpendicular to the measurement direction X. The reflective 8 and non-reflective 10 lines are generally arranged in an alternate manner at a predetermined period (i.e. defining a particular spatial frequency). However, select non-reflective lines 10 are missing from the track 7 so as to form discrete codewords thereby encoding absolute position data in the track 7. Further details of such an absolute scale and how absolute position information is encoded within the track is described in International Patent Application no. PCT/GB2002/001629 (publication no. WO 2002/084223), the contents of which are incorporated in this specification by this reference. The scale 6 comprises a single track 7 only, but could comprise multiple tracks. For instance, a separate incremental or separate absolute track could be provided in addition to the track shown if desired.

As will be understood, absolute position data could be encoded in the track 7 by missing reflective lines 8, as well as, or instead of missing non-reflective lines 10. Furthermore, absolute position data could be embedded in the track 7 without the addition or removal of reflective 8 or non-reflective lines 10. For instance, the width of lines or the distance between them could be varied in order to embed the absolute position data in the scale 6. Further still, rather than providing discrete codewords, the absolute data could be embedded in the form of a pseudorandom bit sequence (as for example described in European Patent no. 0503716).

As illustrated in FIG. 2 the readhead 4 additionally comprises a second light source 12 in the form of a light emitting diode (LED), a lens 18, a one dimensional CMOS sensor 20 and a window 22. As shown, in the described embodiment the first light source 3 comprises three independently controllable light emitting LEDs of different colours (e.g. red, green and blue). In the described embodiment, the CMOS image sensor 20 comprises a single row of 256 elongate pixels whose length extend parallel to the length of the reflective 8 and non-reflective lines 10 on the scale. As will be understood, other image sensors could be used instead of a CMOS sensor. For instance, a CCD or a photodiode array could be used instead. Furthermore, a two dimensional image sensor could be used instead of the one dimensional image sensor described.

Light emitted from the second light source 12 passes through the window 22 and falls on the scale 6. The scale 6 reflects the light back through the window 22 which passes through the lens 18 which in turn focuses reflected light onto the CMOS image sensor 20. Accordingly, the CMOS image sensor 20 detects an image of a part of the scale 6, and in particular the track 7.

Figure 3:
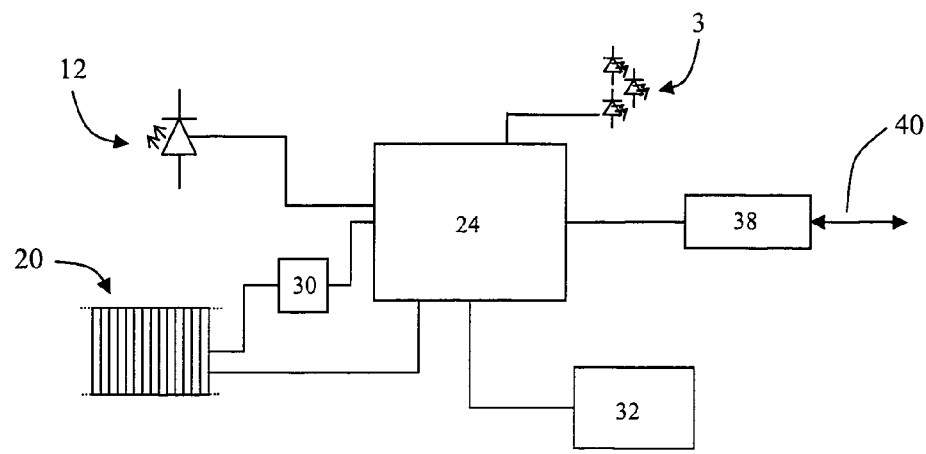
FIG. 3 is a schematic illustration of the electronic components of the readhead of the absolute encoder shown in FIG. 1.
Figure 7:
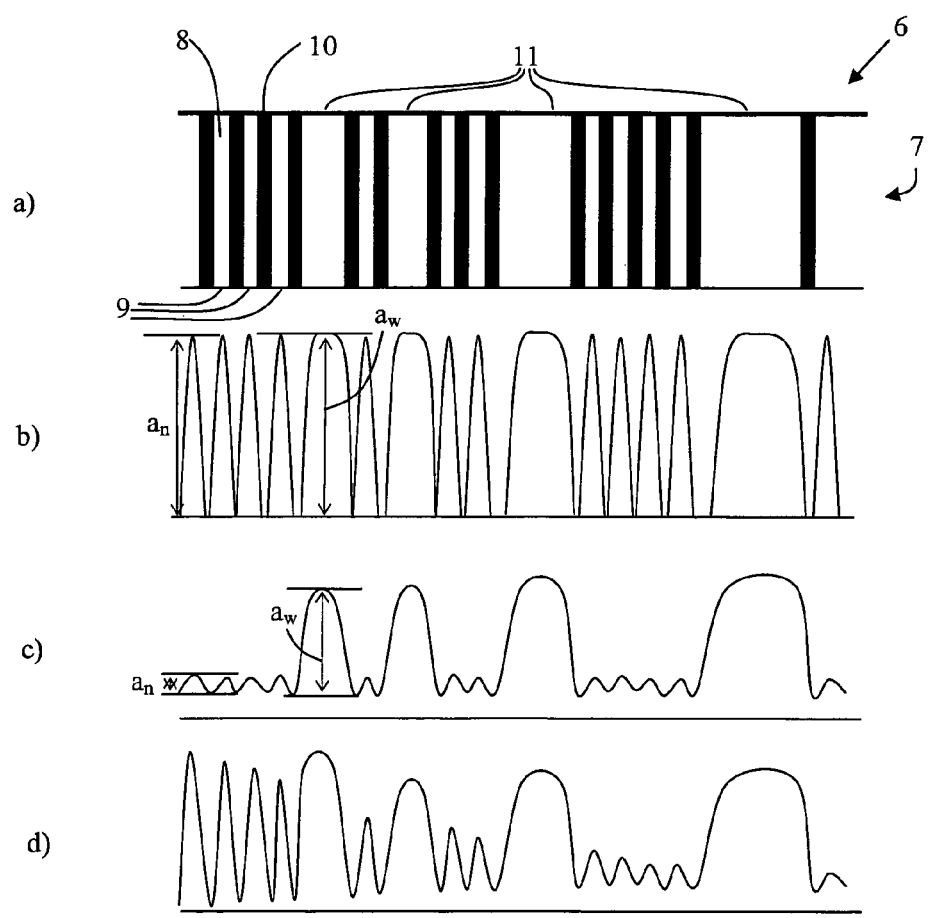
FIG. 7a is a schematic plan view of the scale shown in FIG. 1.
FIG. 7b is a schematic illustration of an optimal output from the sensor of the readhead shown in FIG. 1.
FIG. 7c is a schematic illustration of a sub-optimal output from the sensor of the readhead shown in FIG. 1 due to improper relative rideheight and/or yaw of the readhead and scale.
FIG. 7d is a schematic illustration of a sub-optimal output from the sensor of the readhead shown in FIG. 1 due to improper relative pitch of the readhead and scale.

Referring to FIG. 3, the readhead 4 also comprises a processor 24, an analogue-to-digital converter (ADC) 30, a memory device 32 in the form of Electrically Eraseable Programmable Read-Only Memory (EEPROM) or Flash Memory, and an interface 38. As will be understood by a person of ordinary skill in the art, the readhead 4 can comprise other suitable electrical components, e.g. amplifiers, drivers, etc., which have been omitted from FIG. 3 for the sake of clarity.

The three LEDs of the first light source 3 are connected to the processor 24 so that they can be operated independently on demand by the processor 24. The CMOS image sensor 20 is connected to the processor 24 via the ADC 30 such that the processor 24 can receive a digitised image of the intensity of light falling across the CMOS image sensor 20. The CMOS image sensor 20 is also directly connected to the processor 24 so that the CMOS image sensor 20 can be operated to take a snapshot of intensity falling across it on demand by the processor 24. The processor 24 is connected to the memory 32 so that it can store and retrieve data for use in its processing as described in more detail below. The interface 38 is connected to the processor 24 so that the processor 24 can receive demands from and output results to external devices (not shown) via line 40.

Referring to FIGS. 4 to 7, the operation of the absolute encoder 2 will now be described. With reference to FIG. 4, a high level overview of the method of operation 100 will be described. The method begins by powering up the readhead 4 at step 102. For instance, this can be done by turning the readhead's power supply (not shown) on. The readhead 4 then at step 104 obtains a snapshot representation of the track 7. This can be in response to a position request received from an external device (e.g. a controller) via the interface 38. Optionally, this can be in response to an internally generated request, e.g. by the processor 24 configured to request snapshot representations to be obtained for analysis as required. The readhead 4 obtains the snapshot representation by the processor controlling the second light source 12 to illuminate the track 7 and at the same time controlling the CMOS sensor 20 and ADC 30 to obtain a digital image of the track 7.

With reference to FIG. 7(a), there is shown a schematic plan view of the track 7, having a plurality of reflective 8 and non-reflective 10 lines. As shown, the track 7 comprises a number of narrow features (for example, those indicated by reference numeral 9) and a number of wider features (for example, those indicated by reference numeral 11). In the embodiment described the narrow features are those having a width, in the measuring dimension, less than the fundamental period of the reflective 8 and non-reflective lines 10, and the wide features are those having a width, in the measuring dimension, equal to or greater than the fundamental period of the reflective 8 and non-reflective 10 lines. However, this need not necessarily be the case and other criteria can be used to determine what are wide features and what are narrow features. For instance, the wide features can be simply those features on the scale that are relatively larger in the measuring dimension than other features on the scale (i.e. what is considered to be a wide feature and a narrow is determined in a relative manner and depends on the type of scale used). As shown in FIG. 7(a) the wider features do not need to be all of the same width; rather they can have different widths.

The readhead (not shown in FIG. 7(a)) is arranged over the scale 6 so that the CMOS detector 20 can capture a representation of the scale 6. The quality of the representation can be dependent on the setup of the readhead 4 and scale 6. For instance, if the readhead 4 is located too close to or too far away from the scale 6, and/or if the readhead 4 is pitched (e.g. rotated about the Y-axis), rolled (e.g. rotated about the X-axis) and/or yawed (e.g. rotated about an axis perpendicular to the plane of the scale 6, e.g. the Z-axis) relative to the scale, and/or for instance if the scale is dirty, then the quality of the representation, and its ability to provide reliable position information along the measuring dimension of the scale, can be impaired. In particular, this can make it difficult for the readhead to reliably identify the features on the scale 6 and hence make it difficult to determine an accurate relative position of the readhead 4 and scale 6 in the at least one measuring direction.

For example, with reference to FIG. 7(b), there is shown the representation of the track 7 as obtained and output by the CMOS detector 20 of a readhead 4 that is properly set up relative to the scale 6. In this case, the quality of the representation is good, and in particular there is good signal amplitude across the entire representation. In particular, it can be seen that the amplitude $a_n$ of the narrow features on the track 7 are substantially the same as the amplitude $a_w$ of the wide features.

With reference to FIG. 7(c), there is shown the representation of the track 7 as obtained and output by the CMOS detector 20 of a readhead 4 having a less than optimal ride-height relative to the scale. In this case, the quality of the representation is poor. In particular the amplitude of the signal has dropped across the entire representation, with the amplitude $a_n$ of the narrow features dropping significantly more than the amplitude $a_w$ of the wide features. The representation of the track shown in FIG. 7c is also representative of the situation in which the readhead 4 and scale 6 have a less than optimal angular alignment relative to the scale about an axis perpendicular to the scale (e.g. about the Z-axis shown in FIG. 1).

With reference to FIG. 7(d), there is shown the representation of the track 7 as obtained and output by the CMOS detector 20 of a readhead 4 having a less than optimal angular alignment relative to the scale about an axis parallel to the scale but perpendicular to the extent of the array of the CMOS sensor (e.g. about the Y-axis shown in FIG. 1). In this case, the quality of the representation is poor. In particular, the amplitude of the signal is still strong at one side of the representation (i.e. the side obtained by the CMOS sensor that is still close to the scale) but drops toward the other side (i.e. the side obtained by the CMOS sensor that pitches away from the scale). Again, the amplitude of the narrow features dropping significantly more than the amplitude of the wide features.

At step 106 the processor 24 processes the representation of the track to extract the absolute relative position information in order to determine the absolute relative position of the readhead 4 and scale 6. This can be done using known techniques, for instance using the techniques described in International Patent Application no. PCT/GB2002/001629 (publication no. WO 2002/084223). Once the absolute position has been determined the position can be output at step 108.

At step 110 the processor 24 processes the representation of the track to determine setup information. The detail of step 110 is shown in more detail in FIGS. 5 and 6 which are described below. As shown in FIG. 4, step 110 can occur in parallel to step 106. However, this need not be the case and steps 106 and 110 could occur in series (with step 106 occurring before 110 or vice versa). As will also be understood not every representation of the track that is obtained need be processed to determine setup information. For instance, the readhead could be configured to only analyse every other representation, or any other sequence of representations in order to determine setup information. Furthermore, the readhead could be configured to analyse representations and determine setup information on demand only.

Once the setup information has been obtained, the processor 24 controls the first light source 3 to output the setup information to the user in accordance with the result obtained during the previous step 110. For example, in this embodiment, the processor 24 could turn the red LED on when the setup information obtained in the previous step 110 indicates that the readhead 4 and scale 6 are inadequately configured and to turn the green LED on when the setup information indicates that the readhead 4 and scale 6 are adequately configured. As will be understood, the red, green and blue LEDs could be controlled in a plurality of different ways to indicate different setup information to the user.

Whilst the readhead 4 is powered the method continues in a loop and control passes back to step 104. The method continues until the readhead 4 is turned off.

With reference to FIG. 5, a first method for determining the setup information will be described in more detail. The method comprises identifying at step 202 one or more wide features in the representation, and then identifying at step 204 one or more narrow features in the representation. Suitable techniques for identifying in the representation which are narrow features and which are wide features include measuring the width of the features and comparing with the fundamental period of the features in the scale.

At step 206 the amplitude $a_w$ of the wide features is compared with the amplitude $a_n$ of the narrow features to obtain an amplitude ratio. This comprises dividing i) the average amplitude of all the narrow features in the representation by ii) the average amplitude of all of the wide features in the representation. As will be understood, other techniques could be used to compare the features. In particular, the method might compare the amplitude of just one narrow feature (for instance the feature with the smallest amplitude) with the amplitude of just one wide feature. Optionally, the method might compare the amplitude of features on the left of the representation with those on the right of the representation.

At step 208 the method comprises comparing the amplitude ratio to threshold values stored in the memory 32 to determine the setup indicator output. There could be provided only a single threshold which is to be at a level greater than the amplitude ratio required in order to be able to extract reliable position information from the representation. For example, if the amplitude ratio is less than this minimum threshold, then this can be an indication of a poor quality representation, and the setup indicator output could be selected such that the processor 24 will control the first light source 3 to emit red light so as to warn the user that the readhead 4 and scale 6 are not properly setup. However, if the amplitude ratio is greater than this predetermined threshold, then the setup indicator output could be selected to instruct the processor 24 to control the first light source 3 to emit green light so as to indicate to the user that the readhead 4 and scale 6 are adequately setup. Furthermore, the first light source 3 could be controlled in different ways to indicate different setup states to the user. For instance, different combinations of illumination of the LEDs in the light source could be used to generate different colours, and/or the LEDs could be controlled to flash on and off, at different rates, in order to signal different setup states. This could be achieved by determining the extent by which the amplitude ratio exceeds a minimum threshold and controlling the LEDs accordingly. For example, this could be achieved by providing a plurality of thresholds values being set at levels indicative of different magnitudes of the quality of the representation and hence readhead/scale set up. The amplitude ratio could then be compared to these in order to determine how to control the LEDs (e.g. if the amplitude exceeds the highest threshold then green light is emitted, if the amplitude ratio falls between a highest and lowest threshold then orange light is emitted, and if the amplitude ratio falls below the lowest threshold then red light is emitted). This could also be achieved using only a single threshold and the output (e.g. the colour, brightness and/or flashing frequency) being dependent on how much the amplitude ratio is above the minimum threshold.

If desired, the output could also indicate how the quality of the representation could be improved. For instance, the step 110 of determining setup information could comprise determining whether the amplitude ratio varies across the representation. If so, then this can be an indication that the readhead and scale are relatively pitched and so the output could indicate this to the user. For example, there could be an array of LEDs on the readhead which can be controlled to indicate the direction (and optionally the extent) of any pitch. Accordingly, the output could convey information on how the quality of the representation is sub-optimal.

With reference to FIG. 6, a second method for determining the setup information will be described in more detail. The method comprises at step 302 Fourier Transforming the representation at the fundamental spatial frequency of the narrow features. As will be understood, the fundamental spatial frequency, ω, can be provided during setup of the encoder apparatus, or could be calculated by analysis of the representation of the scale prior to step 302. The magnitude, A, of the Fourier transform is then established at step 304. As will be understood, a Fourier transform provides a real part $\Re$ and an imaginary part $\Im$, and the magnitude A can be calculated from the following equation:

$$A = \sqrt{[\Re(F(\omega))]^2 + [\Im(F(\omega))]^2} \text{ or } A^2 = [\Re(F(\omega))]^2 + [\Im(F(\omega))]^2 \quad (1)$$

where F(ω) represents the Fourier transform of the representation at spatial frequency ω

Since computing a square root is computationally intensive, it will be understood that it may be preferable to use $A^2$ instead of A to determine the setup indicator output.

At step 306 the method comprises comparing the A (or $A^2$) to threshold values to determine the setup indicator output.

As will be understood, A (or $A^2$) is dependent on the amplitude of the narrow features as obtained in the representation. This is in turn affected by the setup of the readhead relative to the scale (which is what is to be determined). A (or $A^2$) is also dependent on the number of narrow features in the representation. Accordingly, if there is significant variation in the density of narrow features along the scale, then the method can comprise steps to compensate for this. For example, this compensation may be achieved by dividing A (or $A^2$) by the number of narrow features in the representation.

In the described embodiment, the method involves Fourier Transforming the representation substantially at the fundamental spatial frequency of the features, and in particular at the fundamental spatial frequency of the narrow features. The Fourier Transform could use an assumed fundamental spatial frequency of the features, based on the scale that it is being used with. Even if the assumed fundamental frequency is not exactly correct, then the method can still provide a useful indication of the quality of the representation. Optionally, the fundamental spatial frequency of the features could be determined by analysing the image before performing the Fourier Transform. This could be useful in embodiments in which the actual fundamental spatial frequency of the features as imaged varies significantly due to rideheight/magnification effects.

Furthermore, as will be understood, it need not necessarily be the case that the Fourier Transform is performed substantially at the fundamental spatial frequency of the features. For instance, the method could involve performing the Fourier Transform at some other frequency, e.g. at a harmonic of the spatial frequency. Optionally, the method could involve performing the Fourier Transform at one or more frequencies and comparing the magnitude of the Fourier Transforms at the different spatial frequencies.

As will be understood, the step of determining setup information 110 in FIG. 4 could comprise executing just the method of FIG. 5, or just the method of FIG. 6. Alternatively, step 110 could comprise performing the methods of both 5 and 6 and basing the status indicator output on the results of both of the methods. Furthermore, step 110 could comprise performing one of the methods of 5 and 6 first, and if that method doesn't provide a definite indication on the quality of the representation (e.g. if the result is close to borderline between a good and bad representation), then step 110 could perform the other method to determine the setup indicator output.

Furthermore, the step of determining setup information 110 in FIG. 4 could comprise other methods, in addition or alternatively to those described above. For instance, the methods could comprise determining how the amplitude of the features in the representation varies across the representation. For example, with reference to FIG. 7(d) the method could compare the amplitude of features at one end of the representation to that the amplitude of the features at the other end to determine the relative setup, and for instance the relative pitch (e.g. rotation about the Y-axis) between the scale 6 and readhead 4. If the scale 6 includes redundancy in the absolute position data, the step of determining setup information 110 in FIG. 4 could also comprise performing error checking and/or error correction on the representation.

In the embodiments described above, the readhead 4 obtains an optical image of the scale, e.g. representation of scale as imaged by a lens onto detector. However, as will be understood, this need not be the case. For instance, the scale could be a magnetic or for instance a capacitive scale, and the readhead could obtain a representation of the scale via suitably arranged magneto sensitive elements or hall sensor arrays. Accordingly, the encoder apparatus need not be an optical encoder apparatus as described above but could be for example a magnetic, inductive or a capacitive encoder apparatus.

The described readhead obtains a snapshot representation of the scale. However, this need not necessarily be the case. For example, the photodiode array could continuously provide representations of the track.

In the described embodiment, the setup output is based on the analysis of just one representation. However, this need not be the case and could for instance be based on the analysis of a plurality of representations of the scale obtained by the readhead. For example, individual setup data could be obtained for each of a plurality of representations, and the setup output signal could be determined from an average of the setup data obtained for each of the representations.

In the embodiment described the same representation is used to determine position information (in step 106) and setup information (step 110). However this need not be the case. Separate representations of the track 7 could be obtained and used. The separate representations could be obtained by the same detector arrangement. Optionally, different detector arrangements could be used. Furthermore, as will be understood, it need not be necessary to determine the absolute position at all. For instance, the method could be executed as part of a setup routine performed before any position determination is needed.

In addition to, or alternatively to, providing a user detectable setup output as described above, other types of output could be provided. For example, an output indicative of the quality of the representation could be provided to a controller in communication with the readhead. The controller could then make a decision on the basis of the output whether to halt or continue the operation of a machine in which encoder apparatus is used.

The invention claimed is:

1. A method of operating an absolute encoder apparatus, the encoder apparatus comprising a scale having features defining absolute position information in at least one measuring dimension, and a readhead configured to read the features, the method comprising: obtaining at least one representation of at least some of the features defining absolute position information; analysing the at least one representation to determine at least one parameter indicative of the quality of the representation; and providing an output indicative of the relative setup of the scale and readhead based at least in part on the at least one parameter.

2. A method as claimed in claim 1, in which determining the at least one parameter is based solely on the at least one representation.

3. A method as claimed in claim 1, in which analysing the at least one representation comprises analysing the quality of at least some of the features in the representation.

4. A method as claimed in claim 1, in which analysing the at least one representation comprises analysing the strength of at least some of the features in the at least one representation.

5. A method as claimed in claim 4, in which analysing the at least one representation comprises analysing the amplitude of at least some of the features in the at least one representation.

6. A method as claimed in claim 1, in which the track comprises a first type of feature and at least a second type of feature, the quality of representation of the first type being more sensitive to the relative arrangement of the readhead and scale, and in which determining the at least one parameter comprises analysing features of the first type.

7. A method as claimed in claim 6 in which the features of the first type are smaller than the features of the second type at least in the at least one measuring dimension.

8. A method as claimed in claim 6, in which analysing the at least one representation comprises comparing features of the first type to the features of the second type.

9. A method as claimed in claim 1, in which analysing the at least one representation comprises Fourier Transforming at least part of the representation.

10. A method as claimed in claim 9, comprising performing one or more Fourier Transforms of at least part of representation at one or more frequencies related to the spatial frequency of the features of the first type.

11. A method as claimed in claim 9, in which the parameter indicative of the quality of the representation is based on the magnitude of at least one Fourier Transform.

12. A method as claimed in claim 1, in which analysing the at least one representation comprises analysing the orientation of at least some of features in the at least one representation.

13. A method as claimed in claim 1, in which the output is based solely on the at least one parameter.

14. A method as claimed in claim 1, in which the encoder apparatus is an optical encoder apparatus.

15. A method as claimed in claim 1, in which the scale comprises a single track only.

16. A method as claimed in claim 1, further comprising, analysing the at least one representation to determine the relative position of the readhead and scale in the at least one measuring dimension.

17. A method as claimed in claim 1, the readhead comprising circuitry which is configured to determine the at least one parameter.

18. A method as claimed in claim 1, the readhead comprising an output device, and in which the output based on the at least one parameter is output via the output device.

19. A method as claimed in claim 18, in which the output device comprises a visual indication device.

20. A method as claimed in claim 19, in which the output device comprises a Light Emitting Diode.

21. A method as claimed in claim 1, in which the output is at least partly based on the determination of whether the quality of the representation meets a threshold quality.

22. A method as claimed in claim 21, in which the output is indicative of the level of the quality of the representation.

23. A method as claimed in claim 21, in which the threshold quality is greater than the quality of representation required in order to extract reliable position information from the representation.

24. An absolute encoder apparatus comprising a scale having features defining absolute position information in at least one measuring dimension, and a readhead configured to read the features, in which the apparatus is configured to: obtain, via the readhead, at least one representation of at least some of the features; analyse the at least one representation to determine at least one parameter indicative of the quality of the representation; and provide an output indicative of the relative setup of the scale and readhead based at least in part on the at least one parameter.

25. A readhead for an absolute encoder apparatus, comprising: at least one sensor for obtaining at least one representation of at least some of the features; circuitry configured to analyse the at least one representation to determine at least one parameter indicative of the quality of the representation; and an output device for providing an output indicative of the relative setup of the scale and readhead based at least in part on the at least one parameter.

* * * * *